United States Patent
Blaser

(10) Patent No.: US 11,977,371 B2
(45) Date of Patent: May 7, 2024

(54) TEXTILE MACHINE MANAGEMENT SYSTEM AND METHOD

(71) Applicant: Maschinenfabrik Rieter AG, Winterthur (CH)

(72) Inventor: Niklaus Blaser, Brütten (CH)

(73) Assignee: Maschinenfabrik Rieter AG, Winterthur (CH)

( * ) Notice: Subject to any disclaimer, the term of this patent is extended or adjusted under 35 U.S.C. 154(b) by 441 days.

(21) Appl. No.: 17/431,575

(22) PCT Filed: Feb. 14, 2020

(86) PCT No.: PCT/IB2020/051247
§ 371 (c)(1),
(2) Date: Aug. 17, 2021

(87) PCT Pub. No.: WO2020/170097
PCT Pub. Date: Aug. 27, 2020

(65) Prior Publication Data
US 2022/0137610 A1    May 5, 2022

(30) Foreign Application Priority Data

Feb. 18, 2019   (EP) ..................................... 19157617

(51) Int. Cl.
  *G05B 19/418*   (2006.01)
  *B65H 63/00*    (2006.01)
  (Continued)

(52) U.S. Cl.
  CPC ....... *G05B 19/41895* (2013.01); *B65H 63/00* (2013.01); *B65H 67/063* (2013.01);
  (Continued)

(58) Field of Classification Search
  CPC ............ G05B 19/418; G05B 19/41865; G05B 19/41895; G05B 2219/31002;
  (Continued)

(56) References Cited

U.S. PATENT DOCUMENTS

| | | | |
|---|---|---|---|
| 5,434,792 A | * | 7/1995 | Saka .................. G05B 19/4183 700/110 |
| 6,705,523 B1 | | 3/2004 | Stamm et al. |

(Continued)

FOREIGN PATENT DOCUMENTS

| | | |
|---|---|---|
| DE | 41 27 990 A1 | 2/1993 |
| EP | 0 541 483 A1 | 5/1993 |

(Continued)

OTHER PUBLICATIONS

EP Search Report and Written Opinion, dated Aug. 13, 2019.
(Continued)

*Primary Examiner* — Tajash D Patel
(74) *Attorney, Agent, or Firm* — Dority & Manning, P.A.

(57) ABSTRACT

A textile machine management system and associated method for textile machines include automated guided transportation vehicles that transport material carriers between the textile machines. A logistic control system controls movement of the transportation vehicles. A material management apparatus manages the material flow between the textile machines and includes: a material flow database; a prediction module; and a disposition module.

17 Claims, 3 Drawing Sheets

(51) Int. Cl.
*B65H 67/06* (2006.01)
*D01G 21/00* (2006.01)
*D01H 9/18* (2006.01)
*D01H 13/32* (2006.01)

(52) U.S. Cl.
CPC ............. *D01G 21/00* (2013.01); *D01H 9/18* (2013.01); *D01H 13/32* (2013.01); *G05B 19/41865* (2013.01); *B65H 2701/31* (2013.01); *G05B 2219/2634* (2013.01); *G05B 2219/31002* (2013.01); *G05B 2219/31376* (2013.01); *G05B 2219/45193* (2013.01)

(58) Field of Classification Search
CPC ........ B65H 67/06; B65H 63/00; D01G 21/00; D01H 9/18; D01H 13/32; D01H 9/185
See application file for complete search history.

(56) References Cited

U.S. PATENT DOCUMENTS

| | | | |
|---|---|---|---|
| 9,811,804 B1 | 11/2017 | Goenka et al. | |
| 10,803,420 B2* | 10/2020 | Jarvis | G06Q 10/0875 |
| 11,580,613 B2* | 2/2023 | Wagner | G07C 9/28 |
| 11,586,187 B2* | 2/2023 | Futch | B07C 3/18 |
| 11,841,699 B2* | 12/2023 | Sayyarrodsari | G06F 11/00 |
| 2018/0011491 A1 | 1/2018 | Morton et al. | |
| 2020/0306905 A1* | 10/2020 | Sloupensky | D01H 9/185 |
| 2023/0195138 A1* | 6/2023 | Kojitani | G07C 5/085 |
| | | | 701/26 |
| 2023/0303354 A1* | 9/2023 | Fei | G05B 19/41895 |

FOREIGN PATENT DOCUMENTS

| | | | | |
|---|---|---|---|---|
| EP | 1 057 907 A1 | 12/2000 | | |
| EP | 2 455 317 | 5/2012 | | |
| EP | 3 170 778 | 5/2017 | | |
| EP | 3 409 626 | 12/2018 | | |
| EP | 4105368 A1 * | 12/2022 | | D01H 13/32 |
| WO | WO 2015/196736 A1 | 12/2015 | | |
| WO | WO-2023217671 A1 * | 11/2023 | | B65H 67/06 |

OTHER PUBLICATIONS

PCT Search Report, dated Apr. 6, 2020.
Guilherme E Vieira et al., "Rescheduling Manufacturing Systems: A Framework of Strategies, Policies, and Methods", Journal of Scheduling, Boston, pp. 39-62, URL: https://link.springer.com/content/pdf/10.1023/A:1022235519958.pdf.

* cited by examiner

TEXTILE MACHINE MANAGEMENT SYSTEM AND METHOD

FIELD OF THE INVENTION

The present invention concerns a textile machine management system and method according to the independent claims.

BACKGROUND OF THE INVENTION

Various textile machine management systems are known in the prior art.

EP 3170778 discloses a textile-machine management system comprising: a plurality of textile machines each of which includes a plurality of fibre processing units, one control device configured to control the fibre processing units, and one or more shared devices provided on all or some of the fibre processing units in a shared manner; and a management apparatus configured to manage the textile machines. The control and management apparatus includes a communication unit configured to mutually communicate with a terminal device including a display unit configured to display information and a function providing unit configured to provide the terminal device with a plurality of functions for managing one or more of the fibre processing units and/or one or more of the shared devices. The management apparatus or the terminal device includes a display controller configured to cause the display unit to display a screen that corresponds to each function provided from the function providing unit.

WO2015196736A1 discloses an automatic management system for textile production and a management method therefor. The management method comprises: respectively configuring an RFID radio-frequency tag module having encoding information thereabout to each spinning spindle and/or spooling spindle of a transport unit; and configuring a card reader for the RFID radio-frequency tag module corresponding to the position of each specific spinning spindle and/or the position of each specific spooling spindle respectively, so as to acquire tag information and operating state information about each corresponding spinning spindle and/or spooling spindle and transmit same to a data processing module for storage, analysis and processing. By means of the present invention, spool locating and quality on-line monitoring can be conducted quickly, and the spinning quality can be viewed in real time, thereby being beneficial for improving the production automation level, reducing the labour intensity, improving the labour productivity and achieving the automatic management of spinning quality.

EP0541483A1 discloses a spinning mill having a process control computer for at least one group of machines, each machine of the group being provided with its own control which controls the actuator system of the machine (together with any possible auxiliary assemblies assigned to this machine). At least one network for the bidirectional communication between the computer and each machine of the group is provided. Control instructions from the process control computer are directed during the operation of the system to the machine controls via the network. Each machine control passes on the control instructions to the actuator system controlled by this control, the control instructions being converted, if necessary, by the machine control into control signals suitable for the actuator system.

DE4127990A1 discloses a process control for at least one section of a spinning plant, where a process control computer controls at least one machine, has a computer prepd. with at least one program for optimum operation, entered in or by default, to give the targets, conditions, preferences and the state of the units linked to the computer. Process control signals are delivered to the system according to the given parameters and the state of the system for the machine computer(s) to apply machine control. The machine computer also sends signals to the process computer to show actual conditions for the process computer to evaluate the data and determine appropriate working.

EP2455317 provided a management system for a fine spinning winder, which enables a tendency of occurrence of fluff in a yarn spun by a fine spinning unit to be automatically analysed on a unit basis of a bobbin. A tray on which a bobbin wound with a yarn by a spinning frame is set has an RF tag capable of recording thereon information for identifying a fine spinning unit that has wound the yarn on the bobbin set on this tray. A rewinding unit includes a clearer, a unit control section, and an RF reader. A quality inspection section of an automatic winder records the amount of fluff together with the length of the unwound yarn obtained when the clearer detected this amount of fluff, and performs a quality inspection, on a unit basis of the bobbin, on the yarn spun by the fine spinning unit.

EP3409626 discloses a productivity display control device to be provided in a yarn winding machine which includes a plurality of winding units each of which includes a yarn feeder that supplies yarn, a winding device that winds the yarn supplied from the yarn feeder to form a package, and a clearer that detects a yarn defect of the yarn between the yarn feeder and the winding device and determines whether to remove the yarn defect based on a set clearing condition. The productivity display control device includes an arithmetic unit that calculates productivity of the yarn winding machine based on a winding condition set in the yarn winding machine, operation data of the yarn winding machine, and the number of removals of the yarn defects removed based on the clearing condition, and includes a display controller that causes a display device to display information concerning the productivity calculated by the arithmetic unit.

U.S. Pat. No. 9,811,804 discloses a system and method for tracking fibre along a textile supply chain which aids in product tracking and can verify fibre source/origin. However, verifying the fibre origin and type in a textile product purchased at a retail location back to the bale is complicated by the nature of textile processes along the supply chain. The system as described addresses complications, such as contamination/cross-contamination, and is used to track fibre from bales of fibre processed into a textile product throughout a sequence of textile operations. The system captures, for each textile operation, a) input information, b) output information, and c) equipment information related to the equipment used in the textile operation. The output information is associated with the input information of a subsequent textile operation, thereby associating the input information and output information, for each textile operation, with the fibre information for the bales of fibre.

U.S. Pat. No. 6,705,523 B1 discloses a system and method for delivering supplies from a loading dock to a production line using a supply delivery computer system that interfaces with a conveyor computer system to control transportation of supplies from a conveyor system to pick up stations and a vehicle facility manager computer system to control automated guided vehicles that transport supplies from pickup stations on the conveyor system to delivery stations on a production line.

EP 1 057 907 A1 shows control systems and methods which are particularly suitable for spinning mills and in particular are designed to regulate and control foreign fibres and materials which may be found during the spinning process.

SUMMARY OF THE INVENTION

A purpose of this invention is to provide a textile machine management system and method which seamlessly tracks and traces the material flow, its quality, volume, and further characteristics across the different production steps and along the entire production process of a spinning mill.

Another purpose of the invention is to provide a textile machine management system and method which predicts the need of new raw material or semi-finished goods for this current production step to spinning mill logistics or transport systems.

Another purpose of the invention is to provide a textile machine management system and method for sorting raw material, semi-finished or finished goods based inter alia based on individually marked material carrier elements.

Another purpose of the invention is to provide a textile machine management system and method which displays the productivity of the material flow across the different production steps.

Another purpose of the invention is significant reduction of required automated guided transportation vehicles in spinning mills by providing early and precise information on upcoming transformation tasks.

Another purpose of the invention is combining status information of transport equipment and spinning machine information within the same control system and providing such information on a common display.

At least some of these purposes are achieved by a textile machine management system and method according to the corresponding independent claims. Dependent claims give advantageous embodiments.

In particular theses purposes are achieved by a textile machine management system comprising
- a plurality of textile machines, each of which includes a plurality of fibre processing units, one control device configured to control the fibre processing units, said plurality of textile machines comprising end spinning machines;
- a plurality of automated guided transportation vehicles in order to transport material carriers between the plurality of textile machines;
- a logistic control system for controlling movement of the plurality of automated guided transportation vehicles;
- a material management apparatus configured to manage the material flow between the plurality of textile machines comprising
  - a material flow database with information of the material in the spinning mill comprising the position and the time of the material carriers, the quantity and the quality of the material filed on or in the material carrier and about the process speed including delaying events like sliver or yarn breaks of the plurality of textile machines and their specific production position;
  - a prediction module for predicting of the timing of expected required material carrier changes at the plurality of textile machines based on the information in the material flow database; and
  - a disposition module for calculation disposition information for the logistic control system for the paths and the use of the automated guided transportation vehicles based on the prediction module.

Within the context of the present invention, a material flow database may also be a plurality of databases, based on the kind of information (e.g. separate databases for quality information, monitoring information, material carrier information, process speeds etc.).

According to one preferred variation of the present invention, the textile machine management system comprises at least one data acquisition module to transmit and save at least some machine settings of a specified textile machine (and/or specified processing unit of a specified textile machine) used to process the material carried by a specified material carrier to the material flow database. Hence, according to such a variation of the present invention the processing parameters (e.g. machine settings) applied during the processing of the raw material, via the intermediate products to the final product by means of at least one textile machine (but typically multiple textile machines) can be precisely logged (stored) and hence unambiguously be retrieved by at least one unique identifier of a material carrier as described herein.

According to a variation of the present invention, the machine management system comprises a route calculation module to determine (calculate and/or estimate) an estimated time of arrival (ETA) at a point of destination of at least one material carrier to be transported by an automated guided transportation vehicle. Such calculation may be based on one or multiple of data/information selected from: point of origin of the material carrier; point of destination of the material carrier; current position of the material carrier; current position of an automated guided transportation vehicle allocated (assigned) for transporting the material carrier; current speed and/or trajectory of the automated guided transportation vehicle allocated (assigned) for transporting the material carrier; current position and/or speed and/or trajectory of at least one automated guided transportation vehicle that is not allocated (assigned) for transporting the material carrier; maximum speed of the automated guided transportation vehicle allocated (assigned) for transporting the material carrier; spatial arrangement of at least some textile machines; predefine paths/tracks for the automated guided transportation vehicles to be used. A route calculation module may be a separate module or may be part of the prediction module or may be part of the disposition module. Good results may be obtained if the textile management system is adapted to store in the material flow database the estimated time of arrival of a material carrier at a point of destination as calculated by the route calculation.

According to a variation of the present invention, the textile management system may comprise at least one textile machine that comprises only one fibre processing unit. Such a textile machine may e.g. be a carding machine or a drawframe.

Good results may be obtained if at least one automated guided transportation vehicle is a portable robot that follows markers or wires in the floor, or uses vision, magnets, or lasers of other types of sensors for navigation. Particularly good results may be obtained if multiple automated guided transportation vehicles are portable robots as aforementioned. Using such types of automated guided transportation vehicles allows different processing lines to be set up and operated within a spinning mill. Different processing lines can thus be used simultaneously (e.g. for the quasi-simultaneous production of different intermediate or end products) and/or new production lines can be easily rebuilt and/or existing production lines can be easily modified.

However, according to another aspect of the present invention at least one automated guided transportation vehicle may also comprise a carrier of another conveyor system, such as a transport entity configured to receive and transport at least one material carrier and being configured to be conveyed from one specific location (e.g. a textile machine or a specific processing unit of a textile machine) to another specific location (e.g. a textile machine or a specific processing unit of a textile machine) in a spinning mill. According to such a variation of the invention, at least one automated guided transportation vehicle may be a transport entity guided on a rail and switch system, such as an overhead rail and switch system. According to a preferred embodiment of the present invention at least one automated guided transportation vehicle is a carrier of an overhead conveyor system.

Depending on the number and/or type of the textile machines to be managed and/or the way they are interrelated, a material management apparatus may be a single entity (e.g. a single host) or may be embodied as multiple entities (e.g. multiple hosts as a dedicated system). Such entities may be selected from personal computer (PC), server, programmable logic controller (PLC). Multiple processes running on multiple entities may be interconnected using inter-process communication (IPC).

Advantageously, the present textile machine management system seamlessly tracks and traces the material flow across the different production steps based on individually marked (e.g. by unique identifiers) material carriers (bobbins, cans, cubic cans, hooks, clamps etc.) and specific information originating from the raw material or semi-finished goods or end products and the textile machines in the individual production steps, which might relate to origin of the raw material or semi-finished goods or end products, the quality of the material, its volume, its weight, other material characteristics etc.

Advantageously, the logistic control system comprises information about
- the status and settings of the automated guided transportation vehicles; and/or
- the allocating of the automated guided transportation vehicles to different tasks; and/or
- maintenance planning of the automated guided transportation vehicles; and/or
- battery capacity of the automated guided transportation vehicles; and/or
- setting of a security factor and showing impact to productivity.

Advantageously, said material flow database comprises real time information of the material in the spinning mill comprising material flow time (hours) and material flow per hour per machine. Thus, e.g. a human controller and/or a higher-level automatic control system can decide in time on appropriate measures to adjust productivity in case of deviations from predefined target productivity and initiate such measures.

Advantageously, said material flow database comprises information of identified lab test samples of material. This enables quality standards in particular to be monitored and compliance with them to be ensured.

According to an embodiment of the invention, several different safety factors may be defined, and applied by the textile machine management system depending on a given operating condition. In this way, for example, it can be ensured that the automated guided transportation vehicles travel at a lower speed in the first operating state than in the second operating state. In this way, personal safety can be improved.

Advantageously, the material carriers are equipped (provided) with a unique identifier such as a QR-codes, NFC labels or RFID and the automated guided transportation vehicles with readers and transmitters in order to transmit read information to the material flow database, wherein the position and the time of the material carriers and the quantity and the quality of the material filed on or in the material carrier are linked by the unique identifier.

A particularly reliable embodiment of the invention may be obtained if the material carriers are provided with at least one a unique identifier such as a QR-code, a matrix code, a bar code, a NFC label, a RFID tag or a human-readable unique identifier, such as a human-readable serial number. Within the context of the present invention, a human-readable serial number may comprise numbers, letters and other typographical symbols or other types of symbols. For certain types of material carriers (e.g. smaller types of material carriers, such as bobbin tubes) passive or active electronic tags such as NFC, RFID may be advantageous whereas for other material carriers (e.g. larger types of material carriers, such as cans) active system with communication means such as Bluetooth, Zigbee, WLAN, NFC, Z-Wave, RF, GPRS, 3G, 4G, 5G, LTE may be used.

For some applications a material carrier may comprise multiple unique identifiers, preferably at least two unique identifiers selected from QR-code, matrix code, bar code, NFC label, RFID tag and human-readable serial number. On the one hand, this allows redundancy to be achieved—for example, if a unique identifier should be damaged. Such damage e.g. can be caused by abrasion during processing, handling or transport. On the other hand, redundancy can also be achieved when capturing the identifiers on, for example, a machine or an automated guided transportation vehicle.

A particularly efficient embodiment of the present invention may be obtained if an automated guided transportation vehicle is equipped with readers and transmitters in order to transmit read information to the material flow database, the information selected from position of the material carrier when the unique identifier of the material carrier was read, time (e.g. wall time or specific system time of the mill management system) when the unique identifier of the material carrier was read, quantity and the quality of the material filed on or in the material carrier when the unique identifier of the material carrier was read, the different information being linked by the unique identifier.

Advantageously, the material flow database comprises data about the raw material and semi-finished good used by a plurality of textile machines. Such data may e.g. be selected from: material properties, machine settings applied for antecedent processing of the raw material and/or semi-finished good and/or identity of the processing unit and processing unit settings applied for antecedent processing of the raw material and/or semi-finished good.

Advantageously, the material flow database comprises the quality and/or quantity of individually marked (by unique identifiers) bobbins (or other type of material carriers) produced by the end spinning machines. Hence, processing settings of the textile machines applied during previous processing steps as well as material characteristics of raw material and/or at least one intermediate product finally transformed into the material (such as a yarn as end product) carried by a material carrier (e.g. bobbin) and therefore constituting or at least contributing to the quality and quantity of the end product can unambiguously be retrieved by the unique identifier of the material carrier.

Advantageously, said material flow database is connected to a spinning mill application for exchanging at least one of the following information and/or data: machine types and counts, failure rate and alarms, efficiency, uptime and shift production, spare parts stock, raw and end material stock, semi-finished goods information, logistics information and financial information.

Advantageously, a sorting module is connected to the material flow database and the sorting module is connected to a sorting machine located after an end spinning machine in order to select finalized end products based on a pre-defined threshold definition.

Advantageously, the material flow database comprises the quantity and the quality of the material from the textile machines filed on or in the material carrier such as
- weight of the material;
- already past process steps;
- fibre characteristics like material, fibre fineness, hairiness, fibre lengths, specific weight of fibre, fibre, band or sliver status in terms of passed process steps;
- amount of band or sliver cuts:
- length of a fibre strand, sliver, roving or yarn carried by the material carrier.

Advantageously, the material flow database comprises the position and the time of the material carriers from the logistic control system.

Particularly good results may be obtained if the material flow database comprises the position and/or trajectory and/or speed of the material carriers from the logistic control system.

Advantageously, the textile machine management system comprises local processing means operatively connected to the material flow database for processing of the data stored and an application for collecting information and/or data from the textile machines, auxiliary spinning devices and sensors, visualizing it, analysing it, data mining it, providing predictive and/or normative analyses or providing adaptive control functionality.

Advantageously, the textile machine management system comprises a display for displaying status and setting of the automated guided transportation vehicles, the material flow in the spinning mill and information about quality of material produced by end spinning machines and about the sorting.

Advantageously, the disposition module comprises information of the need of a specific material carrier at a specific position at a specific time and for fetching a specific material carrier from a specific location at a specific time. By this e.g. optimized types of material carrier can be used at the right time, allowing to reduce delays in production as well as to improve quality of products.

In particular, theses purposes are as well achieved by a textile machine management method for a textile machine management system, said textile machine management system comprising
- a plurality of textile machines, each of which includes a plurality of fibre processing units, one control device configured to control the fibre processing units, said plurality of textile machines comprising end spinning machines;
- a plurality of automated guided transportation vehicles in order to transport material carriers between the plurality of textile machines;
- a logistic control system for controlling movement of the plurality of automated guided transportation vehicles;
- a material management apparatus configured to manage the material flow between the plurality of textile machines comprising
  - a material flow database with information of the material in the spinning mill comprising the position and the time of the material carriers and the quantity and the quality of the material filed on or in the material carrier;
  - a prediction module for predicting of the timing of expected required material carrier changes at the plurality of textile machines based on the data in the material flow database and on information about the process speed of the plurality of textile machines and their specific production position; and
  - a disposition module for calculation disposition information for the logistic control system;

said management method comprising the steps of
(a) receiving in the material flow database from the plurality of textile machines the quantity and the quality of the material filed on or in the material carrier;
(b) receiving in the material flow database from the logistic control system the position and the time of the material carriers from the logistic control system;
(c) linking in the material flow database information about the time and the position of the material carriers to the quantity and the quality of the material filed on or in the material carrier;
(d) receiving in the material flow database from the plurality of textile machines information about the process speed including delaying events like sliver or yarn breaks of the plurality of textile machines and their specific production position;
(e) predicting in the prediction module the timing of expected required material carrier changes at the plurality of textile machines based on the data in the material flow database;
(f) calculating in the disposition module disposition information for the logistic control system; and
(g) transmitting the disposition information to the logistic control system, said logistic control system calculating the paths and the use of the automated guided transportation vehicles based on the prediction module.

The benefit of the invention is resulting in lower investment and lower operational cost of transportation vehicles in spinning mills equipped with material carrier change timing prediction information due to a more efficient use of transportation vehicles.

BRIEF DESCRIPTION OF DRAWINGS

The invention will be better understood with the aid of the description of an embodiment given by way of example an illustrated by the figures, in which.

Same feature have same reference numbers in different drawings.

DETAILED DESCRIPTION OF THE INVENTION

Figure 1:
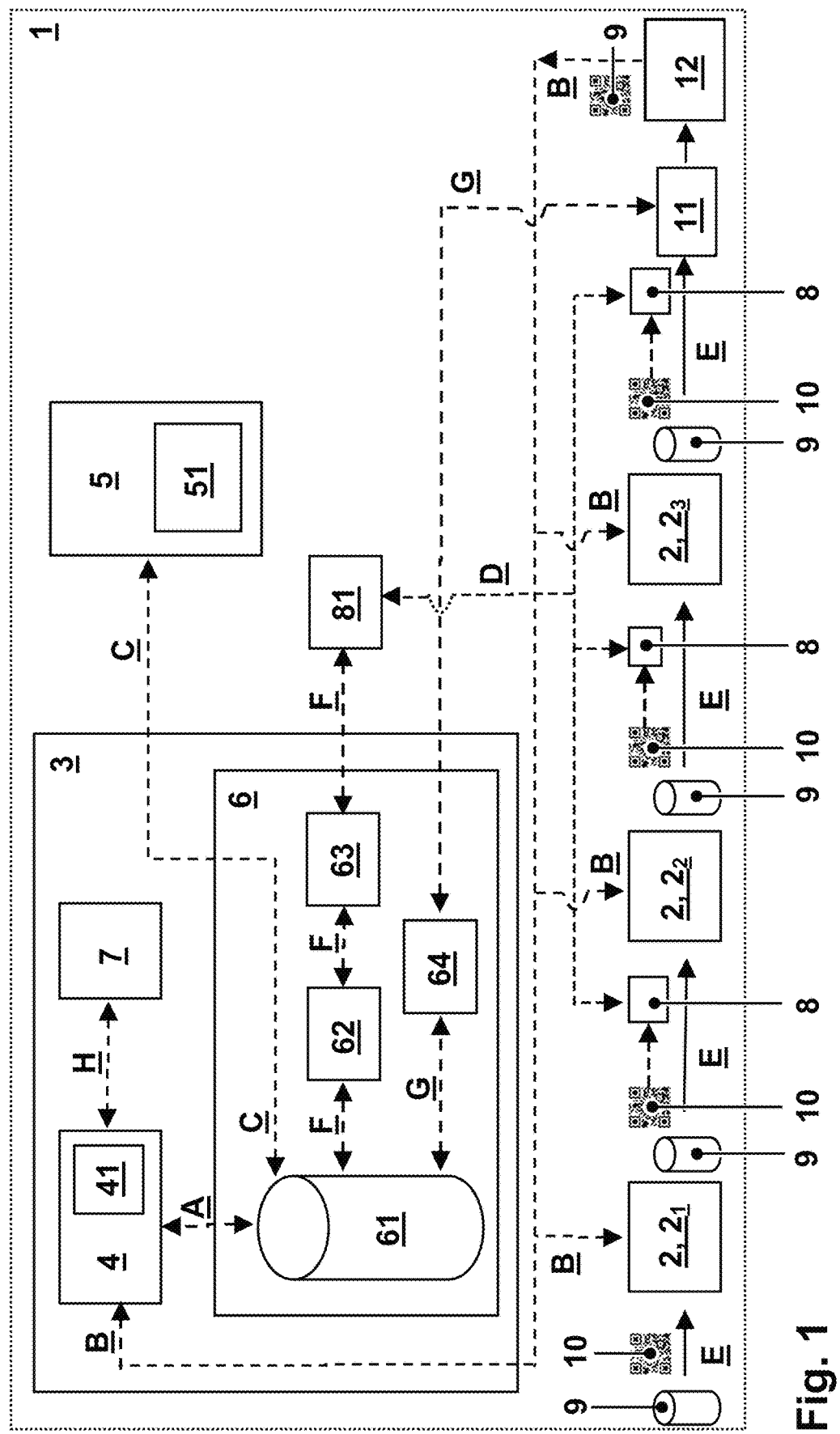
FIG. 1 shows schematically the general configuration of a spinning mill according to the present invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows schematically the general configuration of a spinning mill 1 according to the present invention. The spinning mill 1 comprises a plurality of textile machines 2, $2_1, 2_2, 2_3$, whereby in FIG. 1 the number is only given as an example. The textile machines 2 can be e.g., a bale opener, a card, a regulated or not regulated draw frame, a comber preparation machine or a comber, an end spinning device such as a ring or compact spinning machine, a rotor spinning machine, an air-jet spinning machine, an automatic winder, a roving frame, a weaving machine, a knitting machine, a yarn winding machine, a draw texturing machine, or the like. Each of the textile machines 2 is provided with a programmable control logic (or programmable logic controller (PLC)) and a database. This database could as well be a storage device in simple machines. The spinning mill 1 further comprises a spinning mill platform 3 (Edge Device), which comprises a central mill control application, where the overall control of the spinning mill 1 takes place. The spinning mill platform 3 could be at least partly in a remote location, e.g. it could be based in the cloud.

The spinning mill platform 3 comprises a local processing means 4, for example a processor, operatively connected to a database 61 (double arrow A), for processing of the data stored and an application 41. Such an application 41 could collect information and/or data from the textile machines 2, auxiliary spinning devices and sensors, visualize it, analyse it, data mine it, providing predictive and/or normative analyses or providing adaptive control functionality. Furthermore, the spinning mill platform 3 transmits or reads settings (e.g. specified or desired values) from or to said plurality of textile machines 2 (information flow shown by arrow B). Auxiliary spinning devices in spinning mills like air pressure systems, transport systems, climate control systems, security and surveillance systems and the like could as well be connected to the spinning mill platform 3.

The textile machines 2 furthermore comprise a plurality of sensors for the detection of a plurality of physical quantities of the machine or machine parts or sections, such as an operating parameter. The number of sensors can dependent on the textile machine 2 and the machine parts to be surveyed. During operations the sensors transmitting their measuring values to the corresponding textile machine 2, which collects the information in the storage or database and transmits them to the database 61 of the spinning mill platform 3.

Alternatively or additionally, the sensors could transmit their measuring values directly a spinning mill platform 3 for further analysis. Example for sensors in the present invention are sensors for temperature, velocity, acceleration, optical, camera or force, a capacitive or inductive measuring sensor or any other sensor, which could monitor the corresponding machine or the material processed.

The plurality of textile machines 2 transmits additionally to the database 61 for the entire machine or for a specific production position of the textile machine 2 information about the process speed, which is needed to predict the need of material on the specific textile machine 2. The requirement for the prediction of the following production step in textile machines 2 (preparation of fibres) might be:

feeder speed out of the can based on the fibre characteristics and the machine settings;
potential delay based on sliver (fibre band) cuts and/or yarn breaks;

The requirement for the end spinning machines might be:
feeder speed out of the can based on the fibre characteristics and the machine settings;
information about the yarn breaks occurred during the processing of the individual material carrier 9.

Furthermore, a spinning mill application 5 or a similar platform is as well connected to the spinning mill platform 3. Such spinning mill system 5 could be connected directly or over the internet to the spinning mill platform 3 (information flow shown by arrow C). The spinning mill application 5 comprises a database 51 and comprises as an example an ERP system or process- or machine optimizing application. The spinning mill application 5 could be a central spinning mill application offering special services or collecting, analysing, optimizing and processing data from the spinning mill 1. Between the spinning mill application 5 and the spinning mill platform 3 the following information and/or data could be exchanged: machine types and counts, failure rate and alarms, efficiency, uptime and shift production, spare parts stock, raw and end material stock, semi-finished goods information, logistics information and financial information.

In the framework of the present invention, the transport system comprises of schematically shown automated (or automatic) guided transportation vehicles (AGV) 8. An automated guided vehicle may be a portable robot that follows markers or wires in the floor, or uses vision, magnets, or lasers of other types of sensors for navigation. In the present invention they are used for transporting material between different textile machines 2. In order to facilitate the transport of the material (roving, etc.) between textile machines 2 by the automated guided transportation vehicles 8 in spinning mills different material carriers 9 may be used such as palettes for the raw material and finished material, cans are used for a sliver or roving, bobbins for yarn, etc. The specific shape of the individual material carriers 9 is stored in a database 61. Each material carrier 9 is provided with a unique identifier, such as the schematically depicted QR-code 10 or any other suitable label, respectively aforementioned unique identifier, such as a bar code, matrix code, NFC labels or RFID tags. In this way each material carrier 9 can be identified reliably in a digital manner. The automated guided transportation vehicles 8 are controlled by a logistic control system 81 (information flow D). The logistic control system 81 knows the actual position of the plurality of transportation vehicles 8 and controls their movement between the different textile machines 2.

In the present invention the material is closely monitored on its way through the different production steps. Each automated guided transportation vehicles 8 reads a QR-code 10 of a material carrier 9 by a suitable reader and sends it to the database 61. There it is linked with material information such as quantity, status, quality, origin, time, etc. for the finished material from that textile machine 2.

As mentioned above, the exact filling information of the material carriers 9 was transmitted from the textile machines 2 to the database 61. The characteristics of the filling information can be
weight of the material (e.g. kg);
already past process steps;
fibre characteristics like material, fibre fineness, fibre lengths, specific weight of fibre, fibre, band or sliver status in terms of passed process steps;

amount of band or sliver cuts.

Furthermore, the spinning mill platform 3 gets the information on the raw material used from the spinning mill application 5 and stores it in the material flow database 61. Material information is provided as well by material probes from the lab equipment of the spinning mill 1 or by external sources like raw material inspection certificates, quality test institutes, etc.

Thus, the present textile machine management system seamlessly tracks and traces the material flow across the different production steps based on individually marked material carriers 9 (bobbins, cans, cubic cans, etc.) and specific information originating from the raw material or semi-finished goods or end products and the textile machines 2 in the individual production steps, which might relate to origin of the raw material or semi-finished goods or end products, the quality of the material, its volume, its weight, etc. The direction of material flow is given by arrows E. Material carriers 9 such as cans should always be used for the same material. Foreign fibre issues generated by using cans for different material can thus be excluded.

As seen in FIG. 1 the material flow database 61 is part of a material management apparatus 6 configured to manage the material flow between the plurality of textile machines 2 by the automated guided transportation vehicles 8. The material management apparatus 6 additionally comprises a prediction module 62 and a disposition module 63.

The prediction module 62 predicts the timing of expected required material carrier changes at the plurality of textile machines. The prediction is based on the data in the material flow database and on information about the process speed of the plurality of textile machines and their specific production position (arrow F). The prediction module 62 uses specific algorithms in order to predict the timing of expected required material carrier changes. The accuracy of such a prediction is rising towards the end of the processing cycle of a can since more information about the processing speed and yarn breaks will be available.

Based on the prediction module a disposition module 63 calculates disposition information for the logistic control system 81, which controls the paths and the use of the automated guided transportation vehicles accordingly (arrow F). This information from the disposition module 63 includes the need of a specific material carrier 9 at a specific position at a specific time and fetching a specific material carrier 9 from a specific location at a specific time. The disposition module 63 sends to the logistic control system 81 information, where a material carrier 9 will probably be is used next.

The timing, how much in advance the information of a required material carrier 9 change is transmitted to the logistic control system 81 is depending on the concrete setup of the spinning mill 1 in terms of geographical locations and distances from material carrier 9 to the individual textile machines 2, the amount of transportation vehicles 8 in use, the overall process stability of the spinning process as well as a chosen security factor which can be individually selected by the spinning mill operator. Based on this information, the logistic control system 81 is in position to control the overall activity of the transportation vehicles 8. Advantageously, with the present textile machine management system the number of transportation vehicles 8 in use can be reduced.

The mentioned security factor secures the timely availability of the required material with some reserves at the next production step on one hand, but reduces the overall productivity of the transportation vehicles 8 on the other hand.

The benefit of the invention is resulting in lower investment and lower operational cost of transportation vehicles 8 in spinning mills equipped with material carrier 9 change timing prediction information due to a more efficient use of transportation vehicles 8.

Furthermore, the logistic control system 81 knows the actual position of the plurality of transportation vehicles 8 and the QR-codes 10 read by the transportation vehicles 8, it transfers the information to the material flow database 61 via prediction module 62 and disposition module 63 (arrow F).

End spinning machines (ring spinning machine, rotor, air jet, etc.) producing individualized yarn bobbins as well store the yarn quality of the yarn and the amount on bobbins in the material flow database 61. The yarn quality of a spinning position and individual bobbin is thus known and stored in the material flow database 61. In that way quality sorting information based on pre-defined quality windows can be provided and different quality levels can be selected. For this reason the material flow database 61 provides the information to a sorting module 64 (arrow G) which could as well be part of the material management apparatus 6. The sorting module 64 instructs a sorting machine 11 located between an end spinning machine 2 and finalized end products which are brought onto pallets 12 or similar based on a predefined threshold definition. A specific QR-code 10 characterises a specific content of palettes 12 such as bobbins and their respective qualities. The information about the end material stock could be transmitted via the local processing means 4 and the material flow database 61 (arrows A, B) to the spinning mill application 5 (arrow C).

Figure 2:
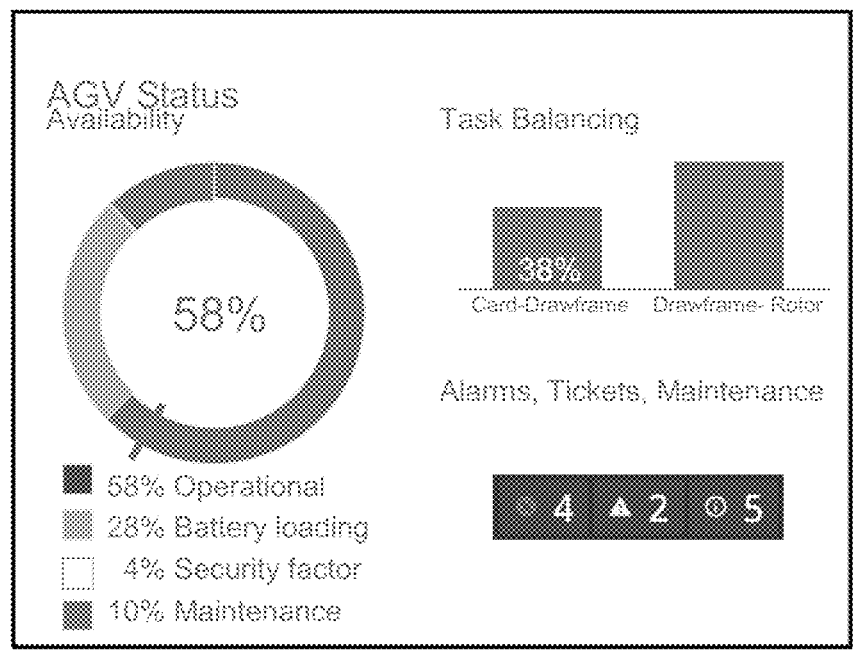
FIG. 2 shows an example of displaying the status of automated guided transportation vehicles in the spinning mill.
Figure 3:
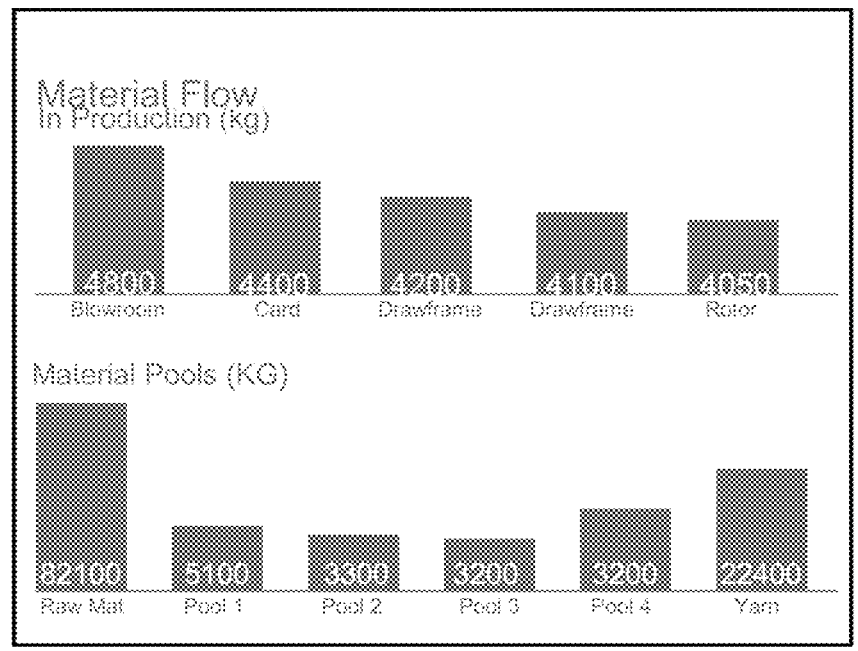
FIG. 3 shows an example of displaying the material flow in the spinning mill.
Figure 4:
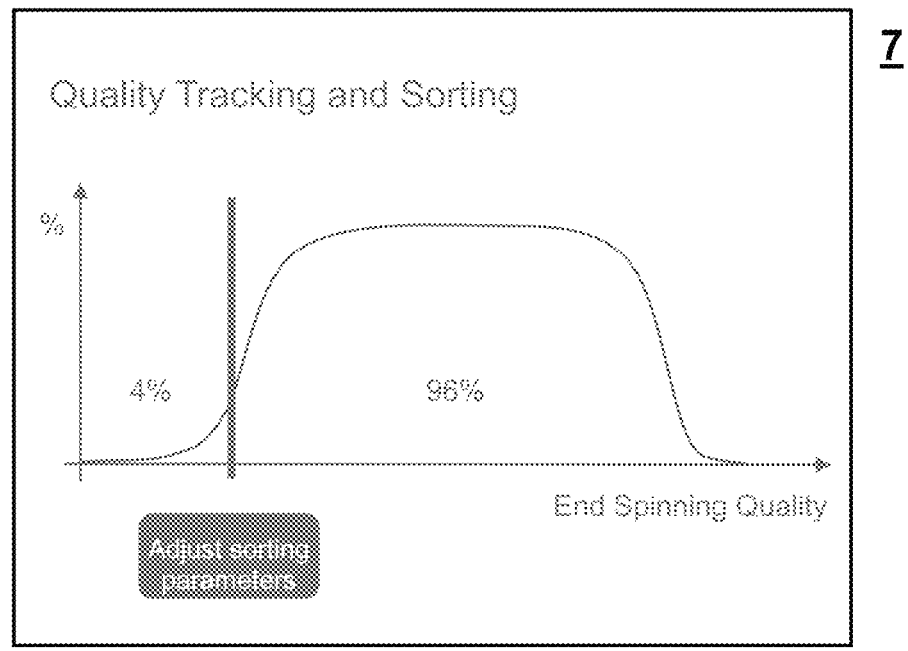
FIG. 4 shows an example of displaying the end spinning quality and sorting.

Additionally, the local processing means 4 is connected to a display 7 (arrow H). As an example the display 7 displays the status and setting of the automated guided transportation vehicles (as seen in FIG. 2), the material flow in the spinning mil (as seen in FIG. 3) and information about quality of material produced by end spinning machines and about the sorting (as seen in FIG. 4). A user could as well beside others enter instruction at the display the mentioned security factor for the logistic control system 81 and said predefined threshold definition of the sorting module 64.

FIG. 2 shows an example of displaying the status of the automated guided transportation vehicles in the spinning mill. By opening such a message additional information can be obtained such as
- detailed alarms;
- task balancing optimization, allocating automated guided transportation vehicles to different tasks;
- detailed battery loading info of automated guided transportation vehicles;
- setting of the security factor and showing impact to productivity.

FIG. 3 shows an example of displaying the material flow in the spinning mill 1. By opening such a message additional information can be obtained about the material flow
- optimal material allocation to pools based on proposals;
- setting reserves to the different pools based on proposals;
- material flow time (hours);
- material flow per hour per machine.

FIG. 4 shows an example of displaying the end spinning quality and sorting. By opening such a message additional information such as the threshold definition can be obtained
- yarn cuts per bobbin;
- hairiness per bobbin.

REFERENCE NUMERALS

1 Spinning mill
2 Textile machine
$2_1$, $2_2$, $2_3$ Textile machine
3 Textile machine management system
4 Processing means
41 Application
5 Spinning mill application
51 Database
6 Material management apparatus
61 Material flow database
62 Prediction module
63 Disposition module
64 Sorting module
7 Display
8 Automated guided transportation vehicles
81 Logistic control system of transportation vehicles 8
9 Material carrier
10 QR-Code
11 Sorting machine
12 Palettes
A Information flow between processing means 4 and database 61
B Information flow between textile machine 2 and processing means 4
C Information flow between spinning mill application 5 and database 61
D Information flow between control center 81 and vehicles 8
E Direction of material flow in spinning mill 1
F Information flow between database 61 and control center 81
G Information flow between database 61, sorting module 64 and sorting machine 11
H Information flow between processing means 4 and display 7

The invention claimed is:

1. A textile machine management system (3) comprising:
a plurality of textile machines (2, 21, 22, 23) in a spinning mill, each textile machine comprising a plurality of fibre processing units and a control device configured to control the fibre processing units, the plurality of textile machines (2) comprising end spinning machines;
a plurality of automated guided transportation vehicles (8) that transport material carriers (9) between the plurality of textile machines (2);
a logistic control system (81) configured to control movement of the plurality of automated guided transportation vehicles (8);
a material management apparatus (6) configured to manage the material flow between the plurality of textile machines (2), the material management apparatus comprising:
a material flow database (61) containing information of material in the spinning mill comprising one or more of: a position and a time of the material carriers (9), quantity and quality of the material in the material carriers (9), process speed including information on delaying events including sliver or yarn breaks at the textile machines, and location of the delaying events;
a prediction module (62) configured to predict timing of expected required material carrier (9) changes at the plurality of textile machines (2) based on the information in the material flow database (61); and
a disposition module (63) configured to calculate disposition information for the logistic control system (81) based on the prediction module (62).

2. The textile machine management system according to claim 1, wherein the logistic control system (81) contains information about one or more of:
status and settings of the automated guided transportation vehicles (8); allocating of the automated guided transportation vehicles (8) to different tasks; maintenance planning of the automated guided transportation vehicles (8); battery capacity of the automated guided transportation vehicles (8); or setting of a security factor and showing impact to productivity.

3. The textile machine management system (3) according to claim 1, wherein the material flow database (61) contains real time information of the material in the spinning mill comprising material flow time (hours) and material flow per hour per machine.

4. The textile machine management system (3) according to claim 1, wherein the material flow database (61) contains information of identified lab test samples of material.

5. The textile machine management system (3) according to claim 1, wherein the material carriers (9) are equipped with a unique machine-readable identifier and the automated guided transportation vehicles (8) comprise with readers and transmitters to read the unique machine-readable identifiers and transmit information to the material flow database (61), wherein the information includes position and time of the material carriers (9) and quantity and quality of the material in the material carriers (9) linked by the unique machine-readable identifiers.

6. The textile machine management system (3) according to claim 1, wherein the material flow database (9) contains data about raw material and semi-finished good used by the plurality of textile machines (2).

7. The textile machine management system (3) according to claim 1, wherein the material flow database (61) contains data about quality or quantity of individually marked bobbins produced by the end spinning machines.

8. The textile machine management system (3) according to claim 1, wherein the material flow database (61) is connected to a spinning mill application (5) to exchange information or data related to one or more of: textile machine types and counts; failure rate and alarms; efficiency; uptime and shift production; spare parts stock; raw and end material stock; semi-finished goods information; and logistics and financial information.

9. The textile machine management system (3) according to claim 1, further comprising a sorting module (64) connected to the material flow database (61) and to a sorting machine (11) located after an end spinning machine (2) in order to select finalized end products based on a predefined threshold definition.

10. The textile machine management system (3) according to claim 1, wherein the information contained in the material flow database (61) related to quantity and quality of the material from the textile machines (2) in the material carrier (9) includes one or more of: weight of the material; past process steps; fibre characteristics including one or more of fibre fineness, hairiness, fibre lengths, specific weight of fibre, fibre, band or sliver status in terms of passed process steps; amount of band or sliver cuts; and length of a fibre strand, sliver, roving or yarn carried by the material carrier.

11. The textile machine management system (3) according claim 1, wherein the material flow database (61) receives the position and the time of the material carriers (9) from the logistic control system (81).

12. The textile machine management system (3) according to claim 1, wherein textile machine management system (3) comprises local processing means (4) operatively connected to the material flow database (61), the local processing means comprising an application (41) for: collecting information or data from the textile machines (2) or auxiliary spinning devices and sensors, visualizing, analyzing, or data mining of the collected information, and providing predictive, normative analyses, or adaptive control functionality.

13. The textile machine management system according to claim 1, further comprising a display configured to display: settings of the automated guided transportation vehicles (8), the material flow in the spinning mill (1), and information about quality and sorting of material produced by the end spinning machines.

14. The textile machine management system (3) according to claim 1, wherein the disposition module (63) contains information regarding a need of a specific material carrier (9) at a specific position at a specific time, and for fetching a specific material carrier (9) from a specific location at a specific time.

15. The machine management system (3) according to claim 1, further comprising a data acquisition module to transmit and save: machine settings of a specified textile machine or a specified processing unit of the specified textile machine used to process the material carried by a specified material carrier (9) to the material flow database (61).

16. The machine management system (3) according to claim 1, further comprising a route calculation module to determine an estimated time of arrival at a point of destination of at least one of the material carriers (9) transported by the automated guided transportation vehicles (8).

17. A textile machine management method for a textile machine management system (3) according to claim 1, the method comprising:
  receiving in the material flow database (61) from the plurality of textile machines (2) date regarding the quantity and the quality of the material filed in the material carriers (9);
  receiving in the material flow database (61) from the logistic control system (8) data regarding the position and the time of the material carriers (9);
  linking in the material flow database (61) the information regarding the time and the position of the material carriers (9) to the quantity and the quality of the material filed in the material carriers (9);
  receiving in the material flow database (61) from the plurality of textile machines (2) information about process speed that includes including delaying events related to sliver or yarn breaks and specific production position of the delaying events;
  predicting in the prediction module (62) timing of expected required material carrier (9) changes at the plurality of textile machines (2) based on the data in the material flow database (61);
  calculating in the disposition module (63) disposition information for use by the logistic control system (81); and
  transmitting the disposition information to the logistic control system (81), the logistic control system (81) calculating paths and the use of the automated guided transportation vehicles (8) based on the prediction module (62).

* * * * *